United States Patent
Sommer et al.

(10) Patent No.: US 7,158,244 B2
(45) Date of Patent: Jan. 2, 2007

(54) PRINT QUEUE MANAGING METHOD AND PRINTER

(75) Inventors: Monique Gerardine Miranda Sommer, Eindhoven (NL); Johannes Hubertus Theodorus Peters, Venlo (NL); Frederik de Jong, Swalmen (NL); Louis Anna Jozef Dohmen, Venlo (NL); Johannes Josephus Maria Goossens, Asten (NL); Pieter Berend Johannes Deen, Meerlo (NL); Veronika Toumanova, Venlo (NL)

(73) Assignee: Océ-Technologies B.V., Venlo (NL)

( * ) Notice: Subject to any disclaimer, the term of this patent is extended or adjusted under 35 U.S.C. 154(b) by 841 days.

(21) Appl. No.: 10/100,025

(22) Filed: Mar. 19, 2002

(65) Prior Publication Data

US 2002/0135792 A1 Sep. 26, 2002

(30) Foreign Application Priority Data

Mar. 20, 2001 (EP) ................................. 01201059

(51) Int. Cl.
*G06F 15/00* (2006.01)
(52) U.S. Cl. ................... 358/1.13; 358/1.15; 358/1.16; 710/54
(58) Field of Classification Search ............... 358/1.13, 358/1.16, 1.15; 400/75; 710/54
See application file for complete search history.

(56) References Cited

U.S. PATENT DOCUMENTS 5,669,040 A 9/1997 Hisatake 5,809,371 A * 9/1998 Inui et al. ..................... 399/81
6,863,455 B1 * 3/2005 Blom et al. .................. 400/61

FOREIGN PATENT DOCUMENTS

| DE | 41 07 000 A1 | 9/1991 |
| EP | 0 469 865 A2 | 2/1992 |
| EP | 0 720 086 A2 | 7/1996 |
| EP | 720086 A2 * | 7/1996 |
| WO | WO 8906024 A1 * | 6/1989 |

* cited by examiner

Primary Examiner—Kimberly Williams
Assistant Examiner—Andrew Lam
(74) Attorney, Agent, or Firm—Birch, Stewart, Kolasch & Birch, LLP

(57) ABSTRACT

A method of managing a queue of print jobs in a printer is disclosed, wherein the jobs are created by specifying print data and print parameters for each job, and the jobs are put into the print queue, and wherein, before print processing of a job in the queue begins, a start condition for the job is checked and printing is started only when the start condition is fulfilled. The method includes steps of checking a status of mode indicator specifying whether the printer is in a "keep going" mode or a "keep sequence" mode; and, when a job in the queue is reached for which the start condition is not fulfilled, postponing print processing of this job and proceeding with a next job, if any, for which the start condition is fulfilled, if the printer is in the "keep going" mode, or stopping print processing, if the printer is in the "keep sequence" mode.

20 Claims, 6 Drawing Sheets

PRINT QUEUE MANAGING METHOD AND PRINTER

RELATED APPLICATION

The present application claims the benefit of European Patent Application No. 01201059.1 filed Mar. 20, 2001, under 35 U.S.C. §119, which is herein fully incorporated by reference.

BACKGROUND OF THE INVENTION

1. Field of the Invention

The present invention relates to a method of managing a queue of print jobs in a printer, wherein the jobs are created by specifying print data and print parameters for each job, and the jobs are put into the print queue, and wherein, before print processing of a job in the queue begins, a start condition for the job is checked and printing is started only when the start condition is fulfilled.

More specifically, the present invention is directed to a high production printer in which a plurality of jobs can be preprogrammed while the printer is busy with printing jobs that have been programmed earlier, so that, ideally, the jobs may be printed one after the other without interrupting the operation of the printer. The term "printer", as used herein, refers to any kind of image reproducing machine that is capable of producing a hard copy of an image, and thus encompasses also copying machines, for example.

2. Discussion of Related Art

If the image to be printed can only be input through a unique data source, e.g. a scanning part of a copier, then, of course the data source does not have to be specified explicitly, and it will be understood that the unique data source is specified implicitly, for example by inputting a scan command in conjunction with the print parameters, e.g., the type and format of copying paper, the reproduction scale, the number of copies, and the like, that have been specified for this job.

If, for example, the print parameters that have been specified for a given job require that the copies are printed on paper with a format or quality that is presently not loaded in the machine, then a so-called start contradiction is encountered, which means that the start condition for this job has not been fulfilled and the job cannot be processed until the operator has loaded the required paper type into the machine. More generally, a start contradiction means that an intervention of the operator is necessary in order to fulfil the start condition for the job.

DE-A 41 07 000 describes a printer implementing a method in which a job, for which the start condition is not fulfilled, is automatically skipped, and the printer proceeds with processing the next job which follows in the queue and for which a start condition is fulfilled. In addition, a warning signal is output in order to alert the operator. This method has the advantage in that the presence of a job for which the start condition has not been fulfilled will not necessarily lead to an interruption of the production process. Instead, the machine will keep operating as long as jobs are present in the queue for which the start conditions are fulfilled. This will give the operator more time to intervene in order to fulfil the start conditions for the remaining jobs.

On the other hand, this method has the drawback in that the original sequence of the jobs in the queue is disturbed, so that the order in which the printed jobs are output from the machine differs from the order in which the jobs have been created by the operator. Since it can generally be assumed that the operator wants to receive the printed jobs in the same sequence in which the jobs have been input, this method leads to errors or inconvenience in the further processing and/or delivery of the printed jobs.

EP-A-0 469 865 discloses a printer in which the operator has the possibility to change the sequence of the jobs in the print queue either by sorting the jobs manually or by having them sorted automatically. In automatic sorting, one of the sort criteria may prescribe that the jobs for which the start conditions have been fulfilled in the present status of the machine are to be processed with higher priority than the jobs for which an intervention of the operator is necessary. However, if such a sorting routine is called-up, this will inevitably spoil the original sequence in which the jobs have been created.

EP-A-0 720 086 discloses a printer in which the criteria for deciding whether or not a start condition is fulfilled can be set by the user. Thus, the user may specify that, for example, a conflict between the color of copy paper prescribed in the print parameters and the colors of the copy papers presently loaded in the printer will not lead to a start contradiction. This would have the effect that the jobs will be printed in the original sequence, without interruption of the production process, but the copies would be printed on paper having the wrong color.

SUMMARY OF THE INVENTION

It is an object of the present invention to provide a printer and a method of print queue management, which permit high production printing with improved operator control over the production process.

It is another object of the present invention to provide a printer and a method of print queue management which overcome the problems and disadvantages of related art.

According to the invention, these objects are achieved by a method of managing a queue of print jobs in a printer, wherein the jobs are created by specifying a data source and print parameters for each job, and the jobs are put into the print queue, and wherein, before print processing of a job in the queue begins, a start condition for the job is checked and printing is started only when the start condition is fulfilled, the method including the steps of checking a status of a mode indicator specifying whether the printer is in a "keep going" mode or a "keep sequence" mode; and when a job in the queue is reached for which the start condition is not fulfilled, (1) postponing processing of this job and proceeding with a next job, if any, for which the start condition is fulfilled, if the printer is in the "keep going" mode, or (2) stopping print processing, if the printer is in the "keep sequence" mode.

Thus, the invention offers the operator a choice between two predefined operating modes which are termed herein a "keep going" mode and a "keep sequence" mode. If the operator chooses the "keep going" mode, the likelihood of occurrence of an interruption of the production process is reduced to minimum, but, in case of a start contradiction, the sequence, in which the jobs are processed may be altered. On the other hand, if the operator chooses the "keep sequence" mode, he can be sure, that the printed jobs will be output in the same order as they have been input, but, if he wants to avoid an interruption of the production process, he must be ready to intervene in case that a start contradiction occurs.

It should be observed here that the occurrence of a start contradiction is quite a usual event in a mass production machine. Since the machine will only have storage facilities for a limited number of different types of copying paper and other supplies, it can only be configured to support a limited number of different job specifications at a time. If, for example, the machine has three storage trays for accommodating different types of copying paper, but five different paper types are specified for the jobs in the print queue, then start contradictions will inevitably occur for at least one of the print jobs.

This is the reason why, normally, there will be an operator who is in charge of the machine and who has the main task to reload the various supplies of the machine as required in order to keep the machine running. On the other hand, there may be considerably long time periods in which the machine could be left alone and the operator could do some other work. If, in this case, the operator remains in the vicinity of the machine, so that he is ready to intervene when necessary, he will prefer to have the machine working in the "keep sequence" mode. If, however, the operator wants to leave the machine for some time, and in particular if he is not certain whether he will be back in time for servicing the machine, then it is a remarkable advantage to have the option to switch the machine into the "keep going" mode.

In the "keep going" mode, it would be possible to alter the print queue by shifting all the jobs for which a start contradiction is present to the end of the queue. However, it is considered to be preferable to leave the sequence of the jobs in the queue unchanged and to handle start contradictions simply by skipping those jobs for which a start contradiction is present. Then, if the operator happens to be back in time for removing the start contradiction, he may switch the machine back into the "keep sequence" mode, and he may then take advantage of the effect that the printed jobs will be output in the order in which they have been created. Of course, the same result may be achieved by temporarily altering the sequence of the jobs in the print queue in the "keep going" mode, but storing the original sequence and re-establishing the same when the machine is switched back into the "keep sequence" mode.

In order to give the operator more control over the sequence in which the print jobs are processed, it is preferable to provide an editing function for editing or sorting the print queue. Such an editing function may for example comprise a "move to top" command by which a selected print job is shifted to the top of the queue. The result of such editing operations will then be preserved when the machine is switched between the "keep going" and "keep sequence" mode.

Such editing functions will place the operator in a position to arrange the print jobs in an order which allows him to carry out the required reloading operations in the most efficient way, i.e. without or with a minimum number of interruptions of the print production.

To this end, it may also be useful to provide an option permitting the operator to interrupt the printing process on purpose after a specific job has been completed. This may be done by selecting this specific job in the print queue and entering a "stop after this" command which instructs the machine to stop printing after the last copy of the selected job has been printed.

Another useful option is a command for putting a selected print job on hold. When a job is put on hold in this way, this has the same effect on the job processing as a start contradiction, i.e. the machine will stop printing when this job is reached in the "keep sequence" mode, and it will skip this job in the "keep going" mode.

In order to further assist the operator in his work, it is possible to display the estimated accumulated processing time, i.e. the time it will take until the printer will stop. In the "keep going" mode, this will be the accumulated time for printing all the jobs for which the start conditions are fulfilled. In the "keep sequence" mode, this will be the time until the first job with a start contradiction is reached.

In a preferred embodiment, the print queue is displayed on a monitor screen or a similar display device. Each job in the queue is symbolized by a small window identifying the job and including also other relevant information such as the present status of the job, the number of pages of the original, the number of copies to be printed as well as the estimated time to finish the job(s). The windows representing the jobs are shown in a sequence corresponding to the sequence of the jobs in the print queue, and jobs for which a start contradiction is present or which have been put on hold are highlighted. If the "stop after this" command has been entered for a specific job, this entry may be symbolized by a stop flag appearing between this job and the subsequent job in the queue.

Additionally, the job list representing the print queue may be expanded into a table providing more specific information on the various jobs, in particular information on the supplies needed for printing the jobs.

BRIEF DESCRIPTION OF THE DRAWINGS

A preferred embodiment of the invention will now be described in conjunction with the accompanying drawing, in which.

DESCRIPTION OF THE PREFERRED EMBODIMENTS

Figure 1:
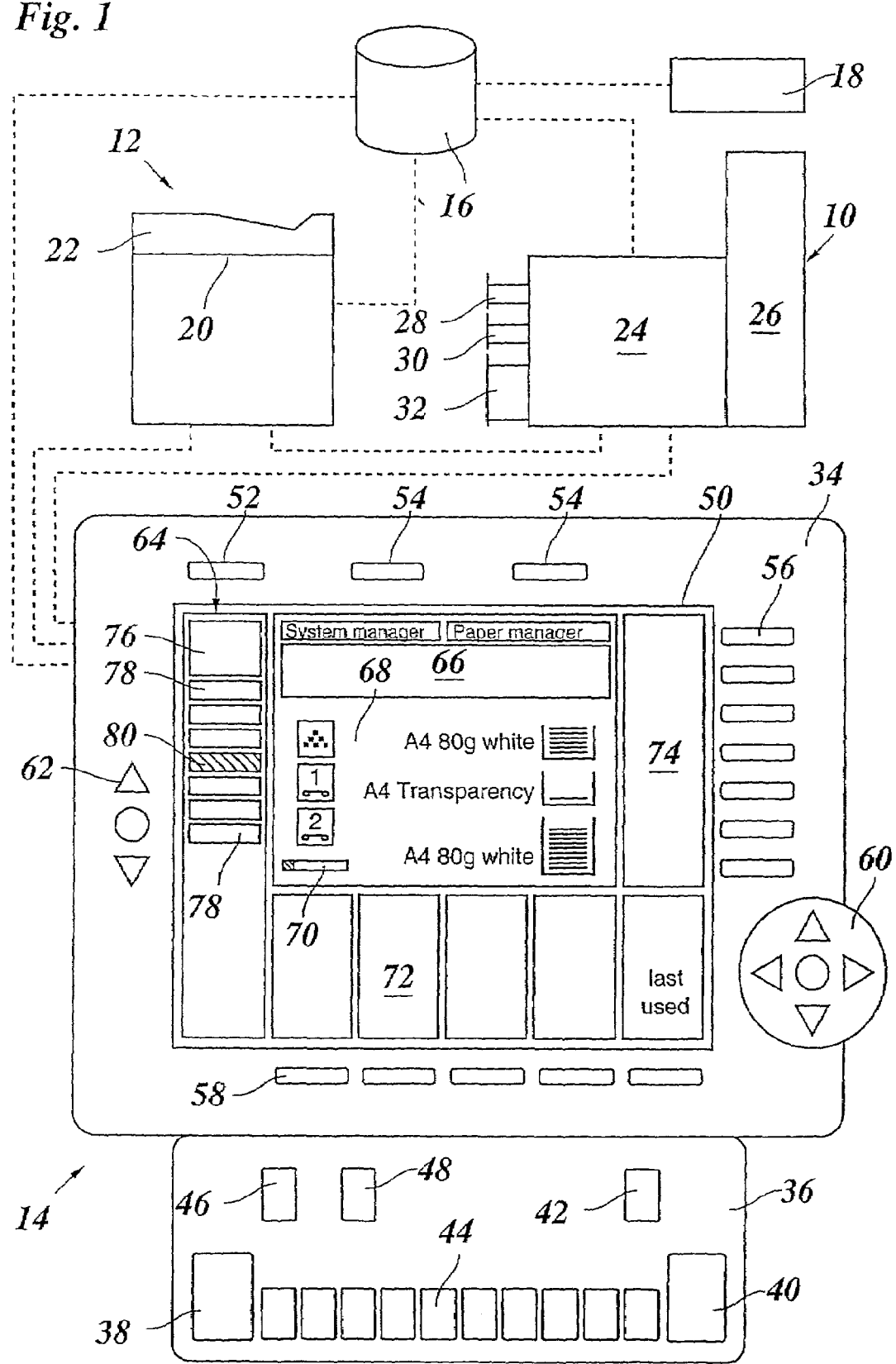
FIG. 1 is a block diagram of an example of a printer to which present the invention is applicable.

In the example shown in FIG. 1, a high production printer 10 and a scanner 12 are installed as separate units but physically close to one another in a Central Reproduction Department (CRD). The printer 10 and the scanner 12 are jointly operated from an operating console 14 which is installed in the same CRD. The printer 10, the scanner 12 and the operating console 14 are operatively connected.

The scanner 12 and the printer 10 which, in combination, form a printer or copier, are directly connected to one another and are further connected to a mass memory 16, e.g. a storage disk, which is also accessible through a network 18 and in which image and text data to be printed may be stored. The memory 16 includes so-called "mailbox" sections for storing image data that are not to be printed immediately. Images scanned by the scanner 12 may either be transmitted directly to the printer 10 or may be temporarily stored in a "local mailbox" section of the memory 16 for being printed later. Likewise, print files received over the network 18 may either be transferred directly to the printer queue or be stored in a "network mailbox" section of the memory 16 for later printing under the control of the operation console 14.

The scanner 12 has a glass platen and an automatic document feeder 22, so that an original document that has been inserted into the feeder 22 and may consist of several single-sided or double-sided sheets, can be scanned-in automatically. In addition, it is possible to deposit documents to be scanned manually on the glass platen 20, after the feeder 22 has been lifted.

The printer 10 comprises a print engine 24 and a finisher 26 in which the stacks of printed copy sheets may be subjected to various finishing procedures such as a stapling, punching, and/or binding, in accordance with print parameters specified for the various print jobs. The printer 10 further has multiple trays 28, 30 and 32 for accommodating copying sheets of different formats and/or qualities. In the example shown, the tray 32 has a larger storage capacity than the other two trays 28, 30. As is generally known in the art, each tray has sensors for automatically detecting the format of the sheets that are presently accommodated therein. The "qualities" of the copying sheets may differ in color, paper weight and material, including also non-paper materials such as transparencies.

The operating console 14 comprises a monitor or display unit 34 and a keyboard 36. As is well known in the art, the keyboard 36 includes a start key 38, a cancel key 40, a stop key 42 and ten digit keys 44. In addition, there is provided an import key 46 which is used for importing a file from the mailbox or from the scanner 12 and appending it to the current print job. A help key 48 serves for calling for online help which will then be displayed on the monitor 34.

The monitor 34 has a display screen 50 with a large display area formed for example by an LCD, as well as a number of keys disposed on a frame around the screen 50. These keys comprise a key 52 for calling-up a job manager which will be described later, and three groups of soft keys 54, 56 and 58 which are disposed, e.g., near the top, right and bottom edges of the screen 50, respectively, where the functions of which will depend on the contents displayed on the screen 50. A key cross 60 may be used for incrementing or decrementing numerical values such as a magnification ratio and the like or for shifting a cursor on the screen 50 and for activating selected objects, as is known in the art. A set of arrow keys 62 is arranged near the left edge of the screen 50 and serves for selecting jobs from a print queue 64 that is displayed in the form of a job list on the left margin of the screen 50, i.e. right below the job manager key 52.

The image on the screen 50, as shown in FIG. 1, is a standard screen image which permits the operator to monitor the status of the printer and from which he may start with creating new print jobs, if desired. This screen image includes a message window 66 in which text messages can be displayed, and a display area 68 which synoptically shows any possible demand for operator intervention.

In the right part of the display area 68, the amounts of copy sheets available in the three trays 28, 30 and 32 are shown symbolically, and the contents of the various trays are indicated. In the example shown, the first tray 28 and the large third tray 32 are loaded with white paper in the format A4 and having a paperweight of 80 g/m2, whereas the second tray 30 is loaded with A4 transparencies. It can further be seen that the supply of the A4 transparencies in the tray 30 is about to run out. Should this tray actually become empty, the corresponding symbol in the display area would turn red or some other designated color, and the operator would be alerted to refill this tray. Similarly, three symbols in the left part of the display area 68 light up when it is necessary to refill the toner or to refill a first or a second staple magazine provided in the finisher 26. A bar diagram 70 in the lower left corner of the display area 68 shows the amount of disk capacity of a storage disk on which the image data received from the scanner 12 are stored temporarily before they are printed out by the printer 10. Below the display area 68, there are shown a number of job templates 72 each of which is associated with one of the soft keys 58. The job templates 72 represent predefined sets of print parameters which are frequently used in practice. Each of the print templates is identified by a name and an appropriate symbol, although this has not been shown in the drawing. Thus, the operator may easily specify a set of standard parameters for a new print shop by pressing the soft key 58 associated with the desired job template 72. In the example shown, the job template in the rightmost position has the name "last used" which means that, when this template is selected, the print parameters specified for the previous defined job are taken over for a new job to be created.

Once a job template has been selected, the print parameters specified therein may be edited, as will be described later.

A window 74 on the right margin of the screen 50 is used for specifying the functions of the soft keys 56. These functions may among others be used for calling-up specific options in conjunction with the parameter settings.

In the print queue 64, each job is represented by a small rectangular window 76, 78 or 80, in which the job is identified. The sequence in which the jobs will normally be processed corresponds to the sequence from the top to the bottom in the print queue 64. A window 76 corresponding to the first job in the queue has an enlarged height which indicates that this job is active, i.e., it is currently being printed. The larger area of the window 76 permits to indicate more detailed information on the active job. The smaller windows 78 relate to jobs that are waiting in the print queue.

In the example shown, the window 80 has a different color, e.g. orange. This indicates that the corresponding job, under the present conditions, will not be processed even when the preceding jobs are completed. The reason may be that this job has been put on hold manually by the operator or that there exists a start contradiction because, for example, none of the trays 28, 30, 32 is loaded with the type of paper that has been specified for this job. Another example for a start contradiction would be that it has been specified for this job that the copies shall be stapled with two staples, so that both stapling units of the finisher 26 would have to be activated, but one of these stapling units has run out of staples. In general, a "start contradiction" is defined here as a state in which it is detected before the print processing of the job begins that at least one of the conditions for printing the job in accordance with the specified print parameters is not fulfilled, but all these conditions can be fulfilled by an appropriate intervention of the operator.

By contrast, a "specification contradiction" is present if the parameter settings themselves are conflicting. This would for example be the case if duplex (double-sided) copies are specified, and transparencies are selected as recording sheets. Such contradictions can only be removed by changing the parameter settings. On the other hand, a "run-time contradiction" is encountered when the print processing of the job has started already but cannot be completed because, for example, the machine has run out of copy paper, or for any other reason. Although this type of contradiction can be removed by intervention of the operator, it is not treated here in the same way as a "start contradiction".

A start contradiction may occur and may be detected already at the instant in which a new print job is being created. When this job is not the first one in the print queue, the preceding jobs may be printed, and the start contradiction may be removed by an intervention of the operator before the print processing of the new job begins. On the other hand, an intervention of the operator may cause a start contradiction that was not present before. This is the case for example if the operator removes the type of paper that is needed for one job in order to insert paper that is needed for another job that is to be printed earlier. As soon as such a start condition is detected, this is indicated by changing the color of the corresponding window 80 in the print queue 64. Under specific circumstances, if the printer 10 is equipped with suitable sensors, it may be possible to predict that a run-time contradiction will occur. If, for example the number of copy sheets still present in the pertinent tray 28, 30 or 32 can be detected with sufficient accuracy, it can be foreseen that, before the print processing of the job begins, the amount of copy paper will not be sufficient for completing the job. This situation may also be treated as a "start contradiction".

Considering the situation depicted in FIG. 1, even if the operator does not intervene in order to remove the start contradiction for the fifth job in the print queue 64 (the one represented by the colored window 80), the printer will continue with print processing of the first four print jobs, for which the start conditions are fulfilled. The start contradiction for the fifth job will only cause a problem when the print processing of the first four jobs is completed. According to the invention, the printer may be operated either in a "keep going" mode or in a "keep sequence" mode, and the behaviour of the printer when a job with a start contradiction is reached will depend upon the operating mode that has currently been set, which will be described in conjunction with FIG. 2.

Figure 2:
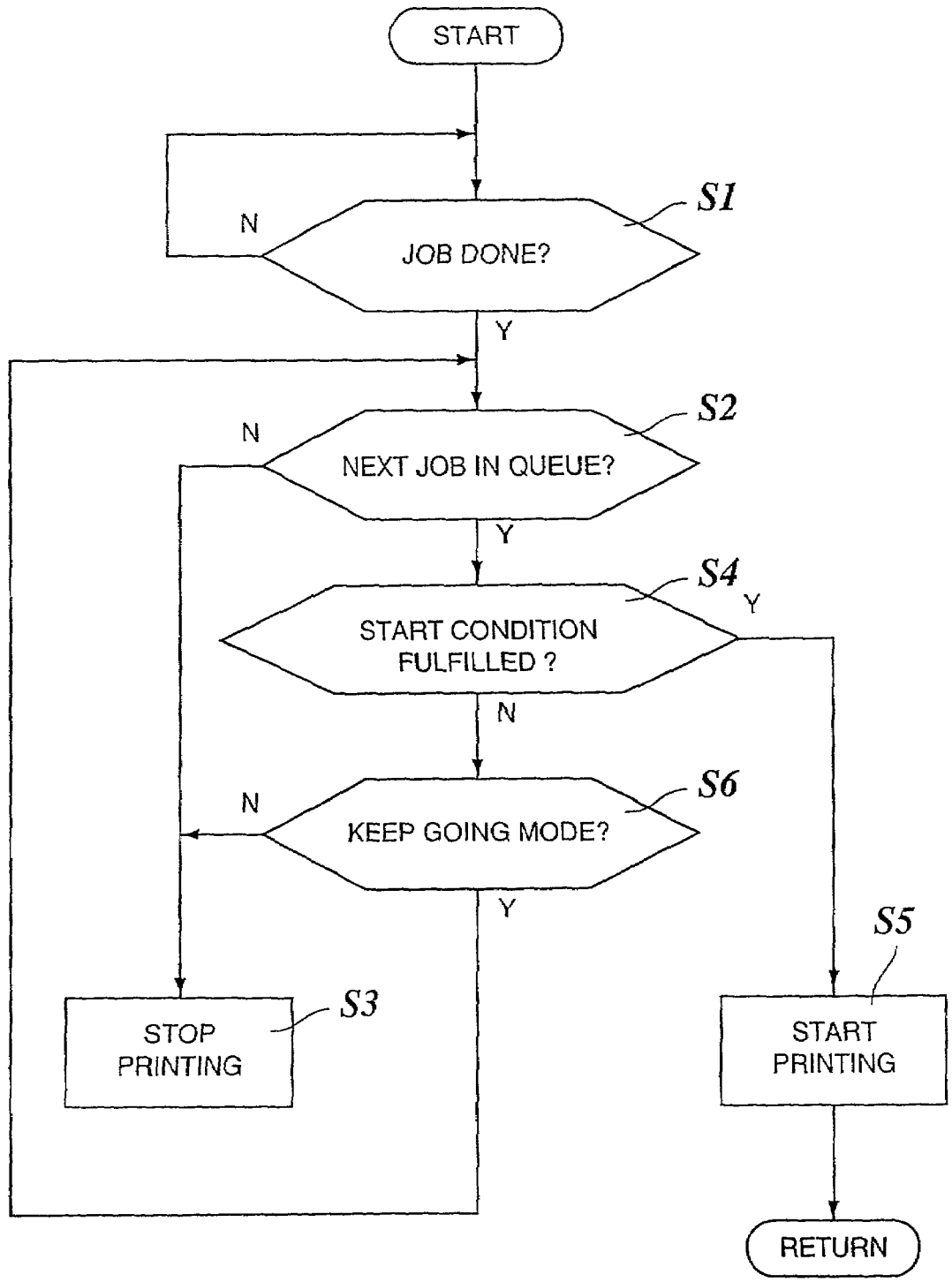
FIG. 2 is a flow chart of a routine implementing a method according to one embodiment of the present invention.

FIG. 2 is a flow chart of a decision routine which is executed repeatedly while an active job is being printed according to one embodiment of the present invention. The decision routine may be implemented in the machine shown in FIG. 1. In step S1, it is checked whether the current job is completed. More specifically, it is checked here whether the last copying sheet for this job has been separated from the pertinent tray.

At this instant, it is necessary to decide whether the print processing of a subsequent job shall start, because the first sheet for the subsequent job would have to be separated in the next machine cycle.

If the current job is not yet completed (N), the routine loops back and repeats the same step S1, until the check has an affirmative result (Y). Then it is checked in step S2 whether a subsequent job exists in the print queue. If this is not the case (N), the print processing is stopped in step S3. Otherwise (Y) it is checked in step S4 whether there exists a flag indicating that the start condition for the subsequent job is not fulfilled. This is only the case if the job neither has a start contradiciton nor has been put on hold. The flag may have been set for example at the time the job was defined or in response to a change in the status of the printer. If the start condition is fulfilled (Y) at step S4, the print processing of the next job is started in step (S5). At the same time, the previous job which has just been completed is removed from the print queue 64, and the other jobs shift upwardly in the queue so that the job that is now being processed is on top of the list and is represented by a large window 76.

If the result in step S4 is negative (N), it is checked in step S6 whether the machine is in the "keep going" mode. If this is not the case (N), this means that the machine is in the "keep sequence" mode, and print processing is stopped in step S3. In this case, the previous job is also removed from the print queue, and the job for which the start condition is not fulfilled is shifted to the top of the list in the queue and is represented by an enlarged window. But this window still remains colored in order to indicate that printing of this job will not start before the operator has fulfilled the start conditions. In addition, the operator may be alerted by an optical, visual and/or acoustic warning signal. After the operator has taken the necessary action in order to fulfill the start conditions and has pressed the start key 38, the printing process will be resumed. Thus, it is assured in this mode that the jobs will be printed exactly in the sequence in which they appear in the print queue 64.

If it is found in step S6 that the machine is in the "keep going" mode (Y), the routine loops back to step S2, where it is now checked whether there is yet another job in the print queue. Then, the step S4 and the subsequent steps are executed as described above. As a result, the job for which the start condition has not been fulfilled is skipped, and if there is at least one other job in the print queue for which the start condition is fulfilled, this job becomes active and is moved to the top of the list in the queue, and the print processing will continue without being interrupted.

Thus, in this mode, there will be no loss in the productivity of the machine as long as there are still print jobs in the list for which the start conditions are fulfilled. Finally the printer 10 will stop when the print queue 64 consists only of jobs for which the start conditions are not fulfilled. These jobs will then be printed after the operator has taken suitable action(s). As a result, in this case, the sequence in which the printed copies are discharged from the finisher 26 will not coincide with the sequence in which the print queue 64 had been established.

The procedure for creating a new print job and adding it to the print queue will now be described in greater detail according to the present invention. For simplicity, it shall be assumed that the print data are to be scanned-in with the scanner 12, and the copies are to be printed immediately with the printer 10. The operator places an original document having, for example, three single-sided sheets, into the automatic document feeder 22. The presence of the document is automatically detected by the feeder 22, and this detection automatically instructs the system to take the document feeder 22 as the data source. Then, the operator selects an appropriate "copy job" template by pressing the associated soft key 58 (FIG. 1). The screen 50 may then for example take the appearance shown in FIG. 3.

The areas of the screen 50 adjacent to the five soft keys 58, where the job templates 72 used to be displayed, now show five menus "Original", "Print", "Staples", "Paper", and "Zoom", for specifying basic print parameters. Each menu has a cursor 82 which points on the set parameter. In the example shown, a single-sided original has been selected in the menu "Original". (Although, strictly speaking, this parameter relates to the scanner rather than to the printer, it shall nevertheless be considered as a print parameter). In the top part of the screen 50, a window which is entitled "Original" shows a symbolic, overlapped representation of the front side and the back side of an original sheet, with the front side being in the foreground. In this example, the fact that the back side is empty indicates that the original is single-sided.

In the menu "Print", it is specified that the copies shall also be single-sided. This is also shown graphically in a window entitled "Print".

The menu "Staples" specifies that the copies shall be stapled with two staples. The staples 84 are also shown in the "Print" window for the graphic representation of the print. This window also indicates the number of the copies to be made, 125 in this case. This number is input with the ten digit keys 44 of the keyboard 36.

The menu "Paper" shows symbols of the three trays 28, 30, 32 and indicates their actual contents. Additional menu points, such as "A4 yellow" indicate other paper types that are at present not loaded in the machine. In the example shown, the A4 yellow paper type has been selected.

The menu "Zoom" permits to select between an automatic mode and a numerical value (e.g. 100%) for the enlargement/reduction scale. In the example shown, the automatic mode has been selected, which means that the enlargement/reduction scale will automatically be determined on the basis of the format of the original as detected by the scanner 12 and the format that has been specified for the printed copies in the menu "Paper".

In order to change the settings in one of the menus, the desired menu is selected by pressing the associated soft key 58. This menu will then become active, and it is possible to shift the associated cursor 82 by pressing on the soft key 56 repeatedly. In an alternative embodiment, the cursor 82 of the active menu may be shifted with the upward and downward arrow keys of the key cross 60. When the settings are changed, the graphic representations in the windows "Original" and "Print" will adapt dynamically.

Figure 3:
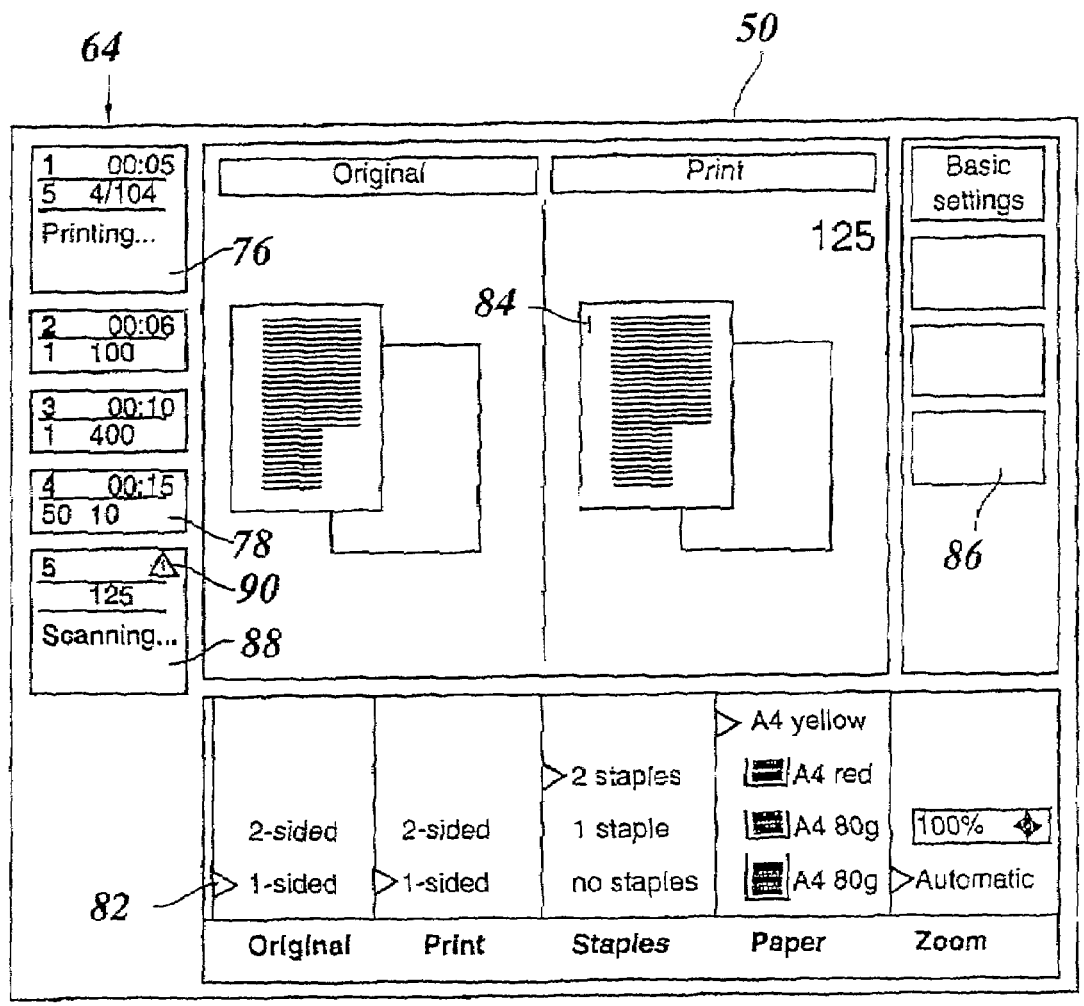
FIGS. 3 to 6 show examples of different screen images that are displayed on screen on an operating console of the printer shown in FIG. 1.

In addition to the five menus for the basic settings as shown in FIG. 3, it is possible to select commands 86 by depressing appropriate ones of the soft keys 56 in order to call-up extended menus for more specific settings. For example, one of the commands 86 may be used for specifying other paper types, i.e. other formats, colors and/or materials. The paper type thus specified will then be transferred into the menu "Paper" shown in FIG. 3, as has been done here for the paper type "A4 yellow".

As is symbolized by an image of the key cross 60 in the menu "Zoom" in FIG. 3, the numerical value can be changed in increments of, for example, 1% by pressing the arrow keys of the key cross 60, once the cursor 82 has been shifted to the numerical value.

As before, the print queue 64 is shown on the left margin of the screen 50. In FIG. 3, the data displayed for the various jobs in the print queue 64 have been exemplified. The meaning of these data will at first be explained by reference to the window 76 for the first job, i.e. the active job.

A job name which, in the present case, simply includes a serial number (1) is indicated in the top left corner of the window 76. Optionally, the owner of the job may be indicated as well. The entry in the next line of the window: "5 4/104" indicates that the original document consists of 5 pages, the number of copies to be printed is 104, and four of the total of 104 copies of the complete document have been printed already. Thus, 100 copies still need be printed. Since each copy consists of 5 pages, the number of pages still to be printed for this job is 500. Assuming that the printing speed of the printer 10 is 100 prints per minute, this means that it will still take about 5 minutes until this job is printed completely. This time estimate, the so-called "time to finish" is indicated in the top left corner of the window 76 as "00:05". Obviously, other algorithms for calculating the time duration needed to finish a print job may alternatively be used, including algorithms that analyze the print data and include the time for rasterizing the same.

The entry in the lower part of the window 76 indicates the current status of the job, i.e. "Printing". This means that the original document has been scanned in, and printing has started. However, the number "4" in the term "4/104" does not indicate the number of sheets that has been separated, but it indicates the number of copies that have already been discharged by the finisher 26.

The smaller windows 78 for the other jobs waiting in the print queue include essentially the same information, except for the detailed status information. All these jobs, i.e. the jobs with serial numbers 2, 3 and 4 in the shown example, have been scanned-in completely, but the print processing has not yet started. This is why the second line in the window 78 shows only the number of document pages (1 in case of job number 2) and the total numbers of copies to be printed (100). The number before the slash indicating the number of printed copies would be zero, and this is why "0" and the slash have been omitted.

The "time to finish" for each print job is always the accumulated time, i.e. the time needed to complete the corresponding job itself plus the "time to finish" indicated for the previous job. For example, job number 2 consists of a one-page document and 100 copies would require a printing time of one minute. Accordingly, the "time to finish" for job number 2 equals one minute plus five minutes for job number 1, i.e., the total of six minutes which is indicated as "00:06" in the window for job number 2. The "times to finish" indicated for the jobs 3 and 4 are calculated in the same way.

The depression of one of the soft keys 58 by which a job template 72 has been called-up, is interpreted by the machine as a request to create a new job. This job is represented by a new large window 88 that is added at the end of the print queue 64. As is shown in FIG. 3, the serial number 5 has automatically been assigned to this job. The window 88 is large because the new job is active. The status "active" applies not only to the jobs that are being printed but also to the jobs which are in the process of being scanned. Job number 5 is has been defined, and the scanning process has just started. Thus, the number of pages of the original document for the job number 5 is not yet known and cannot be indicated in the window 88. Here, only the total number of copies (125) has been specified. Since, in the menu "Paper" a paper-type has been selected which is not presently available in one of the trays, there is a start contradiction for job number 5. This is why the window 88 is colored, and an alarm icon 90 is displayed at the top left corner of the window 88.

When the print parameters for the job number 5 have been specified as desired, the start key 38 is depressed, which starts the scan procedure for this job. The appearance of the screen 50 will return to the standard screen as shown in FIG. 1. The window 88 for the new job will remain in the print queue 64, and while the original document for the job number 5 is being scanned, it will indicate the status information "Scanning . . . ". In order to preserve an unambiguous relation between the jobs that are scanned-in and the print parameters specified therefor, it may not be possible to select a new job template and to enter the print parameters therefor until the scanning of the previous job is completed.

When the job number 5 has been scanned completely, the window 88 will be reduced in size, but will remain colored unless the start contradiction is removed. Then, other new jobs may be added to the print queue 64 by repeating this procedure described above.

Figure 4:
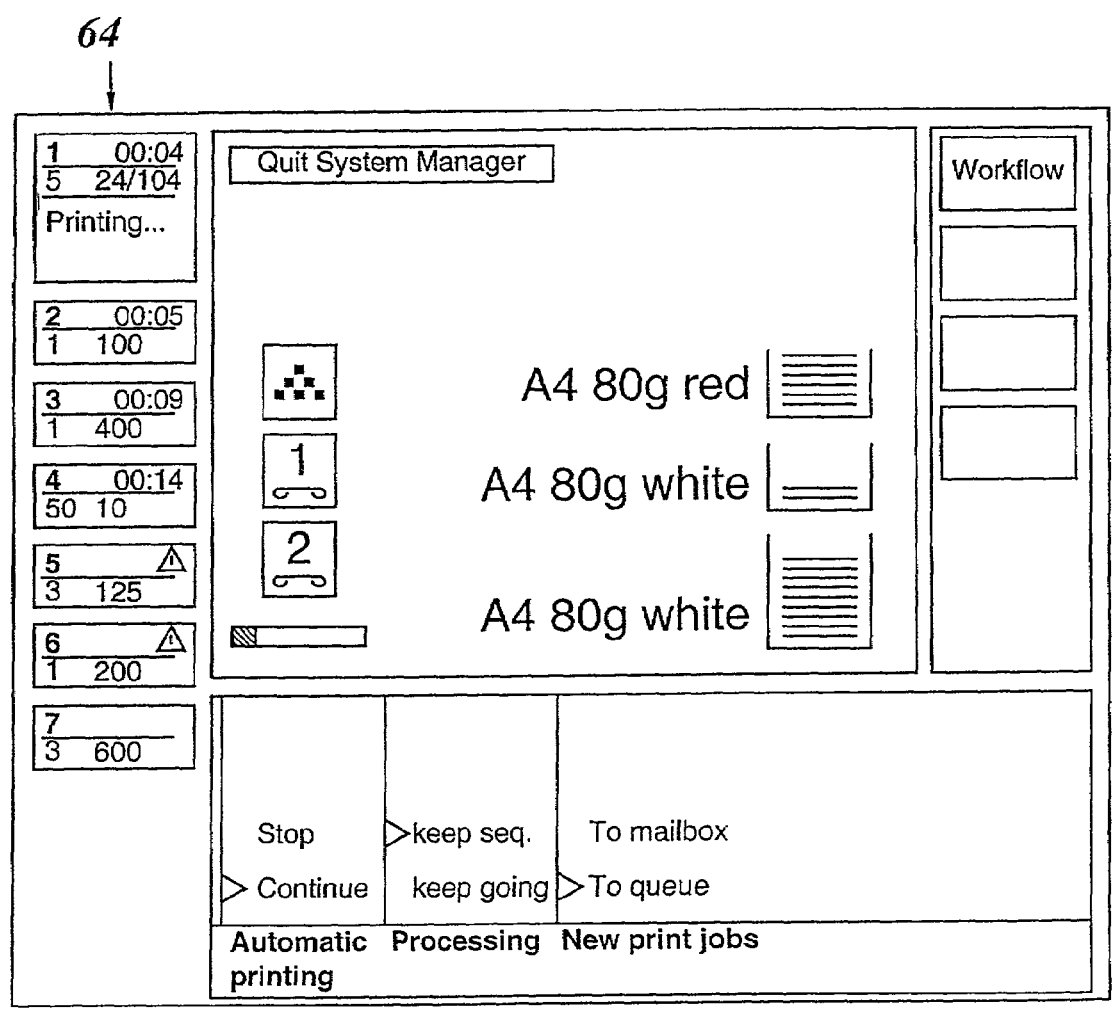

As is shown in FIG. 1, a function called "System manager" may be called-up by depressing the left one of the soft keys 54. The result of this is illustrated in FIG. 4. In place of the job templates 72, there are now shown three menus "Automatic printing", "Processing" and "New print jobs". The process of selecting settings from these menus is analogous to what has been described in conjunction with FIG. 3. What is most important in conjunction with the present invention is the menu "Processing" which permits the operator to switch between the operating modes "keep sequence" and "keep going". In the example shown, the mode "keep sequence" has been selected, which means that the printer 10 would stop as soon as the job number 4 has been completed.

The print queue 64 shown in FIG. 4 corresponds to the example shown in FIG. 3 but reflects the status of jobs one minute later. Thus, the "times to finish" for the jobs 1–4 are all reduced by one minute, and the number of completed copies of job No. 1 has increased to 24.

Meanwhile, the operator has also created two new print jobs with the serial numbers 6 and 7. Job No. 6 has a start contradiction, whereas job No. 7 fulfills all start conditions. Nevertheless job No. 7 will not be printed, because the machine is in the "keep sequence" mode.

It would of course be possible to calculate the "time to finish" for the job No. 7, based for example on the assumption that the start contradictions for the jobs 5 and 6 are removed in time. But this estimated time to finish would not be accurate. In the example shown, no time to finish is indicated for the job No. 7. This may also be taken as an indication that the machine is in the "keep sequence" mode, so that the operator doesn't have to refer to the system manager in order to confirm the operating mode. If the machine is in the "keep going" mode, then the time to finish for job No. 7 would be calculated and displayed without taking the jobs 5 and 6 into account.

The other menus "Automatic printing" and "New print job" relate also to the workflow in the system and have the following meaning.

As was mentioned in conjunction with FIG. 1, it is possible to transmit print jobs to the mailbox part of the memory 16 over the network 18. The data transmitted over the network 18 may also include a job ticket on which the print parameters for the job are specified. Then, when the mode "To queue" has been selected in the menu "New print job", the job transmitted over the network 18 will automatically be appended to the end of the print queue 64. Then, if the mode "Continue" has been selected in the menu "Automatic printing", the jobs received over the network will be printed automatically after all the other jobs have been completed. However, the jobs created by the operator will always have priority over the jobs transmitted for automatic printing. When the mode "Stop" has been selected, the jobs are appended to the print queue, but will not be printed until the operator has manually put them into the print queue as "normal" print jobs.

Conversely, the menu "New print jobs" relates to the question whether the jobs that have been scanned-in with the scanner 12 are to be printed directly (To queue) or are to be stored in the mailbox (To mailbox) without being printed immediately.

In order to quit the system manager and to return to the basic screen shown in FIG. 1, the operator may press the left one of the soft keys 54 a second time.

Figure 5:

Depression of the job manager key 52 in FIG. 1 changes the appearance of the screen 50 as shown in FIG. 5. The job list representing the print queue 64 is expanded into a table which gives an overview of the kind of supplies needed for each job in the queue. As an example only, the table has one column for each of the paper trays 28, 30, 32, another column showing the demand for staples and, finally, a message column. In the example shown, the jobs 1 and 2 are or will be supplied with copying sheets from the first tray 28, job No. 3 will be supplied with sheets from the second tray 30, and jobs Nos. 4 and 7 will be supplied with sheets from the large lower tray 32. The table further shows that one of the two stapling units will be needed for job No. 4 whereas both stapling units will be needed for job No. 5. The message column indicates the reason for the start contradictions for the jobs 5 and 6. In this example, the reason is that the required type of paper is not available in the machine.

When the operator wants to provide the sheets (yellow and green, respectively) required for the jobs No. 5 an No. 6, he has to decide in which trays these sheets shall be placed. From the table shown in FIG. 5 he can see at a glance that it would not be wise to put the yellow or green sheets into the lower tray 32, because this tray, which is presently loaded with white paper, will again be needed for white paper in job No. 7. On the other hand, the two upper trays 28 and 30 will be idle once the job No. 3 has been completed. Thus, it will be reasonable to place the yellow and the green sheets in the trays 28 and 30.

When a new job is created, the machine automatically assigns one of the paper trays to this job, depending on the type of paper that has been specified in the print parameters for this job. To this end, the machine needs to "know" which type of paper is loaded in which tray. When the operator loads a different kind of paper in one of the trays, the new paper type has to be input. To this end, the operator may call up a function called "Paper manager" by pressing the right one of the soft keys 54 in the screen shown in FIG. 1. If it is clear from the job specifications, which type of paper needs to be loaded, then it is sufficient for the operator to confirm that the required type of paper has been inserted. In a more elaborated embodiment, there may also be provided an algorithm for assigning paper trays to the jobs for which the required paper is presently not available (the jobs 5 and 6 in the example shown), and to instruct the operator to load the appropriate sheets into these trays.

As is further shown in FIG. 5, the job manager further provides a number of functions: "Stop after this", "Delete", "Move to top" and "Hold", which may be called-up by pressing one of the soft keys 58. These functions operate on a selected one of the jobs in the print queue (but not on the active job on top of the queue).

When a new job is created, this job will automatically be selected. The selection of jobs may be changed with the arrow keys 62 shown in FIG. 1. The selected job is indicated by highlighting the corresponding window in the print queue 64.

If the print queue is very long, so that the entire job list does not fit into the screen 50, the arrow keys 62 may also be used for scrolling the job list. However, since it is advantageous to have the first active job and also the last job in the queue (normally the one that has just been created) to be always visible, it is preferable to collapse the job list by displaying the windows 78, 80 associated with the non-active jobs in an overlapped manner, e.g. in the form of a stack which leaves visible only the uppermost job and the left and bottom margins of each of the lower jobs. Then, when one of the jobs in the stack is selected by using the arrow keys 62, the stack will be expanded in order to make the selected job fully visible. At the same time, other parts of the queue may be collapsed.

The functions provided in the job manager will now be explained in detail. The function "Stop after this" has the effect that the printer is programmed to stop printing as soon as the selected job, to which the function applies, has been completed. In the example shown, this function has been activated for job No. 3, and this is illustrated by a bar-shaped stop flag 92 appearing between the jobs No. 3 and No. 4. Not more that one stop flag may be set in the print queue. When the key is pressed after another job has been selected, the stop flag 92 will move to the position right below this job.

The function "Stop after this" has some similarity with the function of the stop key 42 in FIG. 1. The difference, however, is that the stop flag 92 acts upon any job that is waiting in the print queue, whereas the stop key 42 acts only on the active job, i.e. the job that is currently being printed. Pressing the stop key 42 once has the effect that the printer will stop after the current job is completed. Pressing the stop key 42 twice will have the effect that the print process will be aborted immediately, i.e. as soon as the next sheet has been printed. The benefit of the function "Stop after this" is that the machine can be preprogrammed to stop at a suitable time. The time after which the machine will stop is indicated by the "time to finish" for the job right above the stop flag 92.

The function "Delete" has the effect that the selected job is removed from the print queue and, thus, will not be printed. If the job was scanned-in with the scanner 12, this will normally mean that the scanned data are lost. Optionally, the machine may however be configured to save the scanned data for the deleted job in the memory 16 or some other accessible storage unit.

The function "Move to top" gives the operator the opportunity to change the sequence of the jobs in the print queue 64 voluntarily. The effect of this function will be that the job that has been selected is shifted to the top of the print queue. More exactly, the selected job is inserted right behind or below the job or jobs for which print processing has started already, i.e. the active job 1 in the given example.

It should be noted however, that, under certain circumstances, there may be more than one job in the status "printing". For example, while the last sheets of a first job are just discharged from the finisher 26, the sheets of a very short subsequent job may be processed in the print engine 24, and the first sheets of yet another job may already be separated from one of the trays 28–32, so that the status "printing" would apply to the first three jobs in the print queue. The job, for which the function "Move to top" has been activated, would then be inserted in the fourth position, i.e. after the three active jobs.

In conjunction with the print queue 64 expanded to a table, as shown in FIG. 5, the function "Move to top" is particularly useful for rearranging the sequence of jobs in such a manner that the number of interventions necessary for providing the required supplies is reduced. If, for example, in the situation shown in FIG. 5, another job No. 8 would be created which shall be printed on red paper (the paper which is presently accommodated in the first tray 28; compare FIG. 4), it would be useful to use the function "Move to top" in order to move this job No. 8 to the position between jobs 1 and 2, so that all the jobs requiring red paper will be printed one after the other and then the first paper tray can be used for another type of paper.

The function "Hold" has the effect that the selected job is put on hold. This means that this job is treated like a job for which a start contradiction is present. The behaviour of the machine will then again depend on the operating mode. In the "keep going" mode, a job that has been put on hold will be skipped, whereas, in the mode "keep sequence" the printer will stop when this job is reached. Pressing the key associated with the function "Hold" a second time for the same job will have the effect that the job is released again and will be treated as a normal job waiting in the print queue.

Figure 6:
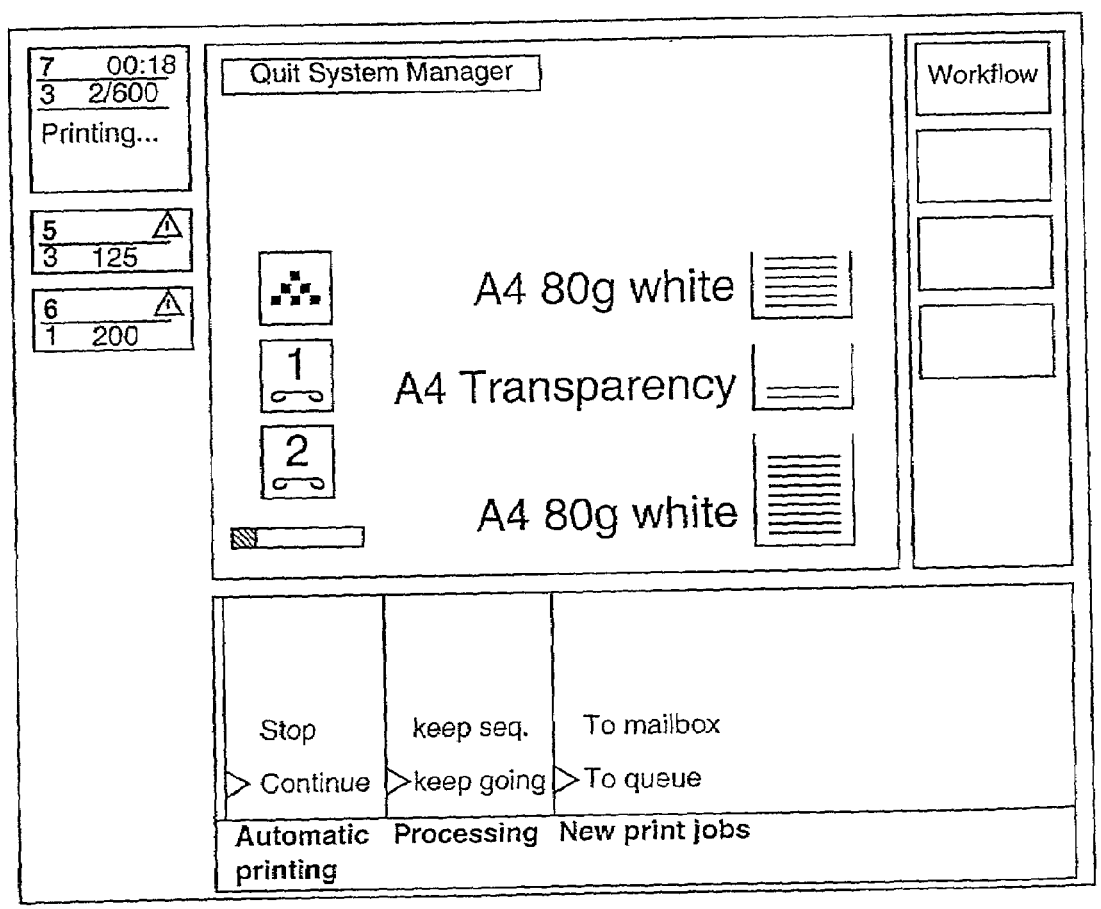

Finally, FIG. 6, which shows again the system manager screen, illustrates the effect of the operating mode "keep going". FIG. 6 illustrates the situation that would be encountered about fifteen minutes after the situation shown in FIG. 4, when the machine has been switched into the "keep going" mode in the meantime. As is shown in FIG. 6, the jobs 1–4 have been printed already and have disappeared from the job list. Jobs 5 and 6 could not be printed because of start contradictions, and job number 7 has "jumped" over the jobs 5 and 6 and is now active. Since the job No. 7 is quite long, the operator has still another eighteen minutes for removing the start contradictions for the jobs 5 and 6. If these start contradictions are not removed and no new jobs without start contradiction are added to the print queue, the machine will stop after having processed the job No. 7.

Accordingly, the present invention provides an advantageous and effective printer and print control method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of managing a queue of print jobs in a printer, wherein the jobs are created by specifying print data and print parameters for each job, and the jobs are put into the print queue, and wherein, before print processing of a job in the queue begins, a start condition for the job is checked and printing is started only when the start condition is fulfilled, the method comprising the steps of:

checking a status of a mode indicator specifying whether the printer is in a "keep going" mode or a "keep sequence" mode, wherein said mode of the printer is set by an operator; and when a job in the queue is reached for which the start condition is not fulfilled, (1) postponing print processing of this job and proceeding with any next job for which the start condition is fulfilled, if the printer is in the "keep going" mode, or (2) stopping print processing, if the printer is in the "keep sequence" mode.

2. The method according to claim 1, wherein, when it is detected for a job in the print queue that the start condition is not fulfilled, the sequence of jobs in the print queue is left unchanged until the print processing has reached the job for which the start condition is not fulfilled.

3. The method according to claim 1, wherein the print queue is displayed on a display unit of an operating console, and the jobs for which the start condition is not fulfilled are marked in the print queue.

4. The method according to claim 1, further comprising the steps of:

calculating, on the basis of the print parameters for the jobs in the print queue, an estimated accumulated time duration after which print processing will stop; and displaying this time duration.

5. The method according to claim 3, wherein a time to finish a job is calculated and displayed at least for each of those jobs in the print queue, for which print processing is not affected by the presence of jobs for which the start condition is not fulfilled.

6. The method according to claim 3, wherein an action necessary for fulfilling the start condition is displayed for each job in the print queue for which the start condition is not fulfilled.

7. The method according claim 3, further comprising the step of:

expanding the print queue into a table which indicates, for each job in the print queue, facilities of the printer that will be needed for printing this job, said facilities including at least two trays from which copying sheets are supplied.

8. The method according to claim 1, further comprising the step of:
editing the print queue by selecting a job from the queue and deleting the selected job, putting the selected job on hold and/or moving the selected job to the top of the print queue.

9. The method according to claim 1, further comprising the steps of:
checking, each time a print job has been printed, whether a stop flag has been set for this job; and
stopping print processing, if this is the case.

10. A printing system for processing a plurality of print jobs one after the other, using a print queue, comprising:
a printing section for printing print jobs on receiving materials;
a user interface, including a mode selector for selecting by an operator either a first or a second mode for the system, the first mode permitting print processing of all print jobs with fulfilled start conditions, and the second mode permitting print processing of print jobs in a requested order;
a controller for managing the print queue, for controlling the printing section and for checking a status of a mode indicator specifying whether the system is in the first mode or the second mode,
wherein, when a job with an unfulfilled start condition in the print queue has reached top of the print queue, the controller (1) postpones print processing of this job and proceeds with any next job with a fulfilled start condition, if the system is in the first mode, or (2) stops print processing, if the system is in the second mode.

11. The system according to claim 10, wherein, when it is detected for a job in the print queue that the start condition is not fulfilled, the controller maintains the sequence of jobs in the print queue as unchanged until the print processing has reached the job for which the start condition is not fulfilled.

12. The system according to claim 10, further comprising:
a display unit controlled by the controller and displaying the print queue, wherein the jobs for which the start condition is not fulfilled are marked in the print queue.

13. The system according to claim 10, wherein the controller calculates, on the basis of the print parameters for the jobs in the print queue, an estimated accumulated time duration after which print processing will stop and controls displaying this time duration.

14. The system according to claim 12, wherein the controller calculates a time to finish a job and controls displaying this time at least for each of those jobs in the print queue, for which print processing is not affected by the presence of jobs for which the start condition is not fulfilled.

15. The system according to claim 12, wherein, under control of the controller, an action necessary for fulfilling the start condition is displayed for each job in the print queue for which the start condition is not fulfilled.

16. The system according claim 12, wherein the controller expands the print queue into a table which indicates, for each job in the print queue, facilities of the printing section that will be needed for printing this job, said facilities including at least two trays from which copying sheets are supplied.

17. The system according to claim 10, wherein the print queue is edited by selecting a job from the queue and deleting the selected job, putting the selected job on hold and/or moving the selected job to the top of the print queue.

18. The system according to claim 10, wherein the controller checks, each time a print job has been printed, whether a stop flag has been set for this job and stops print processing if this is the case.

19. The system according to claim 10, further comprising:
a scanner for scanning document images to be printed by the printing section.

20. A system for managing a queue of print jobs in a printer, wherein the jobs are created by specifying print data and print parameters for each job, and the jobs are put into the print queue, and wherein, before print processing of a job in the queue begins, a start condition for the job is checked and printing is started only when the start condition is fulfilled, the system comprising:
a controller to check a status of a mode indicator specifying whether the printer is in a "keep going" mode or a "keep sequence" mode, wherein said mode of the printer is set by an operator,
wherein when a job in the queue is reached for which the start condition is not fulfilled, the controller (1) postpones print processing of this job and proceeds with any next job for which the start condition is fulfilled, if the printer is in the "keep going" mode, or (2) stops print processing, if the printer is in the "keep sequence" mode.

* * * * *